US012739810B2

(12) United States Patent
Shi et al.

(10) Patent No.: US 12,739,810 B2
(45) Date of Patent: Sep. 15, 2026

(54) TRANSMISSION MECHANISM WITH 120 kHz SUBCARRIER SPACING IN FR1 FOR WIRELESS COMMUNICATIONS

(71) Applicant: ZTE Corporation, Shenzhen (CN)

(72) Inventors: Jing Shi, Shenzhen (CN); Xianghui Han, Shenzhen (CN); Xing Liu, Shenzhen (CN); Peng Hao, Shenzhen (CN)

(73) Assignee: ZTE Corporation, Shenzhen (CN)

(*) Notice: Subject to any disclaimer, the term of this patent is extended or adjusted under 35 U.S.C. 154(b) by 245 days.

(21) Appl. No.: 18/795,945

(22) Filed: Aug. 6, 2024

(65) Prior Publication Data

US 2024/0397502 A1 Nov. 28, 2024

Related U.S. Application Data

(63) Continuation of application No. PCT/CN2022/144099, filed on Dec. 30, 2022.

(51) Int. Cl.
*H04W 72/0453* (2023.01)
*H04L 5/00* (2006.01)

(52) U.S. Cl.
CPC ......... *H04W 72/0453* (2013.01); *H04L 5/005* (2013.01); *H04L 5/0094* (2013.01)

(58) Field of Classification Search
CPC . H04W 72/0453; H04W 48/16; H04W 72/04; H04L 5/005; H04L 5/0094; H04L 27/26025; H04L 27/2613; H04L 5/0053
See application file for complete search history.

(56) References Cited

U.S. PATENT DOCUMENTS 11,502,891 B2 * 11/2022 Choi ..................... H04L 5/0048
2021/0007082 A1 1/2021 Akkarakaran et al.
2021/0368460 A1 11/2021 Fakoorian et al.
2022/0232667 A1 7/2022 Back et al.
2023/0118318 A1 * 4/2023 Si .......................... H04L 1/1642 370/329
2024/0040392 A1 * 2/2024 Qiao ..................... H04L 5/0048

FOREIGN PATENT DOCUMENTS

CN 114503740 A 5/2022

OTHER PUBLICATIONS

Lien, Shao-Yu, et al. "3GPP NR sidelink transmissions toward 5G V2X." IEEe Access 8 (2020): 35368-35382. (Year: 2020).*
Qualcomm, "60kHz optional for sub6 GHz in Rel15", 3GPP TSG-RAN#79, RP-180505, Mar. 19, 2018 (14 pages).

(Continued)

*Primary Examiner* — Sharad Rampuria
(74) *Attorney, Agent, or Firm* — Crowell & Moring LLP

(57) ABSTRACT

This document generally relates to wireless communication involving communication nodes that communicate in FR1 with a subcarrier spacing of 120 kHz. A network device may determine to communicate in a cell at a carrier frequency within frequency range 1 (FR1), and may transmit a set of synchronization signal and physical broadcast channel blocks (SSBs) in the carrier frequency within FR1 with a subcarrier spacing (SCS) of 60 kHz or 120 kHz. A user device searching for the cell at the carrier frequency within FR1 may detect the set of SSBs in the carrier frequency with the SCS of 60 kHz or 120 kHz.

15 Claims, 4 Drawing Sheets

(56) References Cited

OTHER PUBLICATIONS

European Extended Search Report and Search Opinion for EP Application No. 22969813.9 dated Sep. 23, 2025 (6 pages).
Huawei, et al., "Discussion on mandatory gap pattern in R-16", 3GPP TSG-RAN WG4 Meeting #95-e, R4-2007747, May 25, 2020 (3 pages).
Ericsson, "Discussions on RedCap NCD-SSB test design", 3GPP TSG-RAN WG4 Meeting #104bis-e, R4-2216452, Oct. 19, 2022 (11 pages).
International Search Report and Written Opinion for International Application No. PCT/CN2022/144099 dated Sep. 4, 2023 (6 pages).

* cited by examiner

TRANSMISSION MECHANISM WITH 120 kHz SUBCARRIER SPACING IN FR1 FOR WIRELESS COMMUNICATIONS

CROSS-REFERENCE TO RELATED APPLICATIONS

This application is a continuation of International Patent Application No. PCT/CN2022/144099, filed Dec. 30, 2022. The contents of PCT/CN2022/144099 are herein incorporated by reference in their entirety.

TECHNICAL FIELD

This document is directed generally to communication with 120 kilohertz (kHz) subcarrier spacing in frequency range 1 (FR1) for wireless communications.

BACKGROUND 120 kilohertz (kHz) subcarrier spacing (SCS) is currently not supported for communication in frequency range 1 (FR1). However, communication using 120 SCS in FR1 may be desirable or even required in some applications or scenarios, such as business (ToB) applications, user equipment (UE)-specific applications such as RedCap, or applications where low latency reduction in FR1 is desired or needed. Thus, ways to implement 120 kHz SCS in FR1 may be desirable.

SUMMARY

This document relates to methods, systems, apparatuses and devices for wireless communication. In some implementations, a method for wireless communication includes: a method for wireless communication, the method comprising: searching, by a user device, for a cell at a carrier frequency within frequency range 1 (FR1); and detecting, by the user device, a set of synchronization signal and physical broadcast channel blocks (SSBs) in the carrier frequency with a subcarrier spacing (SCS) of 60 kilohertz (kHz) or 120 kHz.

In some other implementations, a method for wireless communications includes: determining, by a network device, to communicate in a cell at a carrier frequency within frequency range 1 (FR1); and transmitting, by the network device, a set of synchronization signal and physical broadcast channel blocks (SSBs) in the carrier frequency within FR1 with a subcarrier spacing (SCS) of 60 kilohertz (kHz) or 120 kHz.

In some other implementations, a device, such as a network device, is disclosed. The device may include one or more processors and one or more memories, wherein the one or more processors are configured to read computer code from the one or more memories to implement any of the methods above.

In yet some other implementations, a computer program product is disclosed. The computer program product may include a non-transitory computer-readable program medium with computer code stored thereupon, the computer code, when executed by one or more processors, causing the one or more processors to implement any of the methods above.

The above and other aspects and their implementations are described in greater detail in the drawings, the descriptions, and the claims.

DETAILED DESCRIPTION

The present description describes various embodiments of systems, apparatuses, devices, and methods for wireless communications related to communication with 120 kilohertz (kHz) subcarrier spacing (SCS) in frequency range 1 (FR1).

Figure 1:
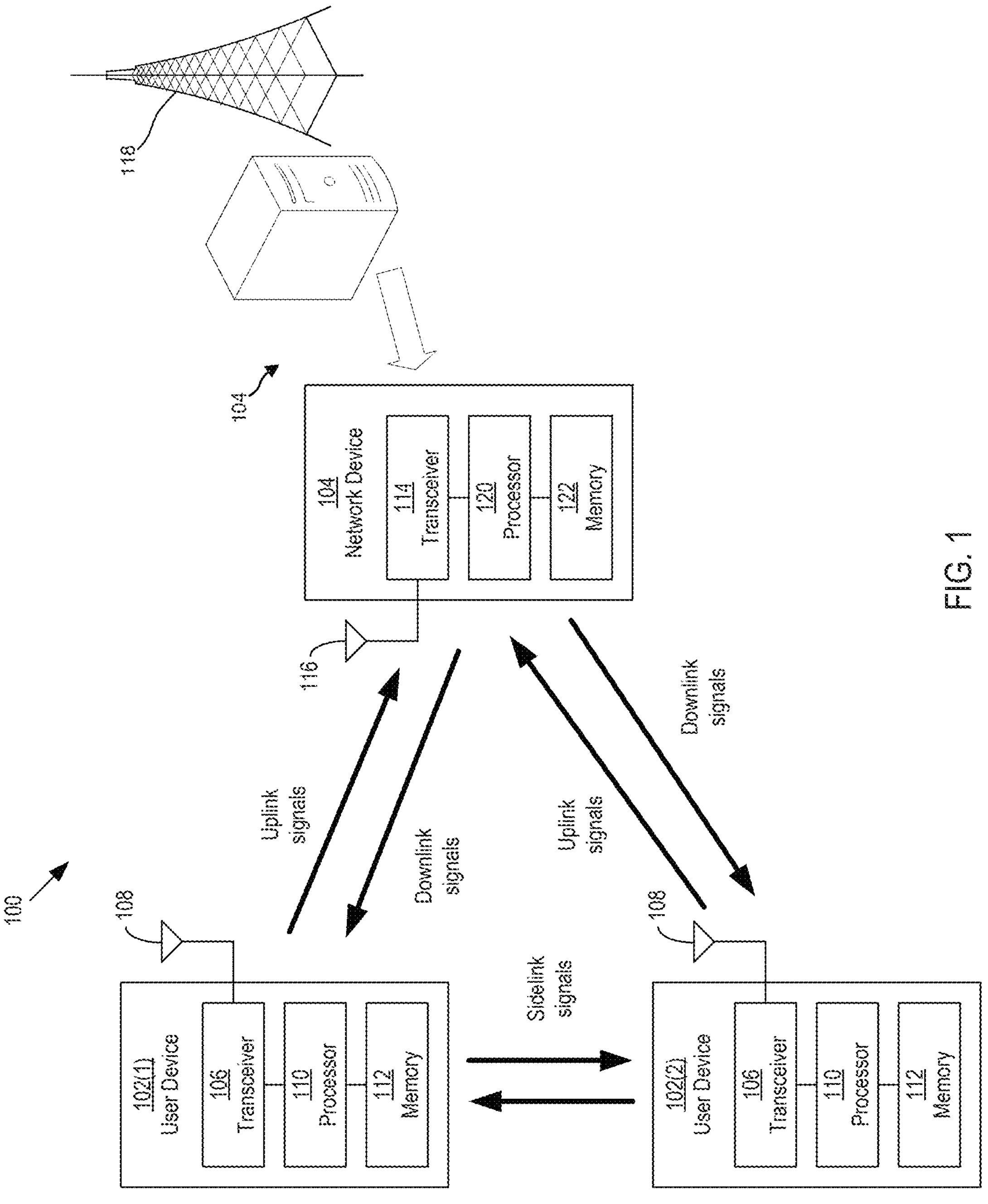
FIG. 1 shows a block diagram of an example of a wireless communication system.

FIG. 1 shows a diagram of an example wireless communication system 100 including a plurality of communication nodes (or just nodes) that are configured to wirelessly communicate with each other. In general, the communication nodes include at least one user device 102 and at least one network device 104. The example wireless communication system 100 in FIG. 1 is shown as including two user devices 102, including a first user device 102(1) and a second user device 102(2), and one device 104. However, various other examples of the wireless communication system 100 that include any of various combinations of one or more user devices 102 and/or one or more network devices 104 may be possible.

In general, a user device as described herein, such as the user device 102, may include a single electronic device or apparatus, or multiple (e.g., a network of) electronic devices or apparatuses, capable of communicating wirelessly over a network. A user device may comprise or otherwise be referred to as a user terminal, a user terminal device, or a user equipment (UE). Additionally, a user device may be or include, but not limited to, a mobile device (such as a mobile phone, a smart phone, a smart watch, a tablet, a laptop computer, vehicle or other vessel (human, motor, or engine-powered, such as an automobile, a plane, a train, a ship, or a bicycle as non-limiting examples) or a fixed or stationary device, (such as a desktop computer or other computing device that is not ordinarily moved for long periods of time, such as appliances, other relatively heavy devices including Internet of things (IoT), or computing devices used in commercial or industrial environments, as non-limiting examples). In various embodiments, a user device 102 may include transceiver circuitry 106 coupled to an antenna 108 to effect wireless communication with the network device 104. The transceiver circuitry 106 may also be coupled to a processor 110, which may also be coupled to a memory 112 or other storage device. The memory 112 may store therein instructions or code that, when read and executed by the processor 110, cause the processor 110 to implement various ones of the methods described herein.

Additionally, in general, a network device as described herein, such as the network device 104, may include a single electronic device or apparatus, or multiple (e.g., a network of) electronic devices or apparatuses, and may comprise one or more wireless access nodes, base stations, or other wireless network access points capable of communicating wirelessly over a network with one or more user devices and/or with one or more other network devices 104. For example, the network device 104 may comprise a 4G LTE base station, a 5G NR base station, a 5G central-unit base station, a 5G distributed-unit base station, a next generation Node B (gNB), an enhanced Node B (eNB), or other similar or next-generation (e.g., 6G) base stations, in various embodiments. A network device 104 may include transceiver circuitry 114 coupled to an antenna 116, which may include an antenna tower 118 in various approaches, to effect wireless communication with the user device 102 or another network device 104. The transceiver circuitry 114 may also be coupled to one or more processors 120, which may also be coupled to a memory 122 or other storage device. The memory 122 may store therein instructions or code that, when read and executed by the processor 120, cause the processor 120 to implement one or more of the methods described herein.

In various embodiments, two communication nodes in the wireless system 100 such as a user device 102 and a network device 104, two user devices 102 without a network device 104, or two network devices 104 without a user device 102—may be configured to wirelessly communicate with each other in or over a mobile network and/or a wireless access network according to one or more standards and/or specifications. In general, the standards and/or specifications may define the rules or procedures under which the communication nodes can wirelessly communicate, which, in various embodiments, may include those for communicating in millimeter (mm)-Wave bands, and/or with multi-antenna schemes and beamforming functions. In addition or alternatively, the standards and/or specifications are those that define a radio access technology and/or a cellular technology, such as Fourth Generation (4G) Long Term Evolution (LTE), Fifth Generation (5G) New Radio (NR), or New Radio Unlicensed (NR-U), as non-limiting examples.

Additionally, in the wireless system 100, the communication nodes are configured to wirelessly communicate signals between each other. In general, a communication in the wireless system 100 between two communication nodes can be or include a transmission or a reception, and is generally both simultaneously, depending on the perspective of a particular node in the communication. For example, for a given communication between a first node and a second node where the first node is transmitting a signal to the second node and the second node is receiving the signal from the first node, the first node may be referred to as a source or transmitting node or device, the second node may be referred to as a destination or receiving node or device, and the communication may be considered a transmission for the first node and a reception for the second node. Of course, since communication nodes in a wireless system 100 can both send and receive signals, a single communication node may be both a transmitting/source node and a receiving/destination node simultaneously or switch between being a source/transmitting node and a destination/receiving node.

Also, particular signals can be characterized or defined as either an uplink (UL) signal, a downlink (DL) signal, or a sidelink (SL) signal. An uplink signal is a signal transmitted from a user device 102 to a network device 104. A downlink signal is a signal transmitted from a network device 104 to a user device 102. A sidelink signal is a signal transmitted from a one user device 102 to another user device 102, or a signal transmitted from one network device 104 to a another network device 104. Also, for sidelink transmissions, a first/source user device 102 directly transmits a sidelink signal to a second/destination user device 102 without any forwarding of the sidelink signal to a network device 104.

Additionally, signals communicated between communication nodes in the system 100 may be characterized or defined as a data signal or a control signal. In general, a data signal is a signal that includes or carries data, such multimedia data (e.g., voice and/or image data), and a control signal is a signal that carries control information that configures the communication nodes in certain ways in order to communicate with each other, or otherwise controls how the communication nodes communicate data signals with each other. Also, certain signals may be defined or characterized by combinations of data/control and uplink/downlink/sidelink, including uplink control signals, uplink data signals, downlink control signals, downlink data signals, sidelink control signals, and sidelink data signals.

For at least some specifications, such as 5G NR, data and control signals are transmitted and/or carried on physical channels. Generally, a physical channel corresponds to a set of time-frequency resources used for transmission of a signal. Different types of physical channels may be used to transmit different types of signals. For example, physical data channels (or just data channels), also herein called traffic channels, are used to transmit data signals, and physical control channels (or just control channels) are used to transmit control signals. Example types of traffic channels (or physical data channels) include, but are not limited to, a physical downlink shared channel (PDSCH) used to communicate downlink data signals, a physical uplink shared channel (PUSCH) used to communicate uplink data signals, and a physical sidelink shared channel (PSSCH) used to communicate sidelink data signals. In addition, example types of physical control channels include, but are not limited to, a physical downlink control channel (PDCCH) used to communicate downlink control signals, a physical uplink control channel (PUCCH) used to communicate uplink control signals, and a physical sidelink control channel (PSCCH) used to communicate sidelink control signals. As used herein for simplicity, unless specified otherwise, a particular type of physical channel is also used to refer to a signal that is transmitted on that particular type of physical channel, and/or a transmission on that particular type of transmission. As an example illustration, a PDSCH refers to the physical downlink shared channel itself, a downlink data signal transmitted on the PDSCH, or a downlink data transmission. Accordingly, a communication node transmitting or receiving a PDSCH means that the communication node is transmitting or receiving a signal on a PDSCH.

Additionally, for at least some specifications, such as 5G NR, and/or for at least some types of control signals, a control signal that a communication node transmits may include control information comprising the information necessary to enable transmission of one or more data signals between communication nodes, and/or to schedule one or more data channels (or one or more transmissions on data channels). For example, such control information may include the information necessary for proper reception, decoding, and demodulation of a data signals received on physical data channels during a data transmission, and/or for uplink scheduling grants that inform the user device about the resources and transport format to use for uplink data transmissions. In some embodiments, the control information includes downlink control information (DCI) that is transmitted in the downlink direction from a network device 104 to a user device 102. In other embodiments, the control information includes uplink control information (UCI) that is transmitted in the uplink direction from a user device 102 to a network device 104, or sidelink control information (SCI) that is transmitted in the sidelink direction from one user device 102(1) to another user device 102(2).

In addition, in various embodiments, communication nodes in the wireless communication system 100, including a user device 102 and/or a network device 104, may be configured to communicate (including transmit and/or receive) signals, or otherwise operate in, one or more frequency ranges (FR). Each frequency range FR includes one or more frequency bands. Each band of a given FR has an upper bound, a lower bound, and/or a center frequency that falls within the given FR. Addition, within a given system 100, each of the one or more frequency ranges may be defined by a specification, standard, or protocol according to which the communication nodes in the system 100 are configured to operate. For at least some embodiments, there are at least two frequency ranges, including a Frequency Range 1 (FR1) (of a first frequency range), and a Frequency Range 2 (FR2). In general, FR1 is a lower frequency range than FR2, in that the upper bound of FR1 is lower than the lower bound of FR2. In some embodiments, such those defined by 5G NR, FR1 is below 10 Gigahertz (GHz). In particular of these embodiments, FR1 is below 8 GHz. In other of these embodiments, a lower bound of FR1 is 410 Megahertz (MHz). In addition or alternatively, an upper bound of FR1 is 7,125 MHz (7.125 GHz). In other embodiments, an upper bound of FR1 is or is less than 6 GHz. Also, in some embodiments, FR2 is greater than 20 GHz. In particular of these embodiments, FR2 is in a range from 24,250 MHz (24.250 GHz) to 71,000 MHz (71 GHz). Also, in some embodiments, a given FR may be divided or organized into sub-ranges. For example, in some embodiments, FR2 includes two sub-ranges FR2-1 and FR2-2. In particular of these embodiments, FR2-2 extends from 24,250 MHz to 52,600 MHz, and FR2-2 extends from 52,600 MHz to 71,000 MHz. Table 1 below shows an example configuration for FR1 and FR2.

TABLE 1

Example Frequency Values for FR1 and FR2

| Frequency range designation | | Corresponding frequency range |
|---|---|---|
| FR1 | | 410 MHz-7125 MHz |
| FR2 | FR2-1 | 24250 MHz-52600 MHz |
| | FR2-2 | 52600 MHz-71000 MHz |

In addition, in any of various embodiments, communication nodes in a wireless communication system 100 may be configured to communicate according to a numerology associated with a frequency range and/or sub-range in which the communication nodes are configured to communicate. A numerology may be identified by a value of p, that, in turn, is associated with, and/or that corresponds to, certain information, including a subcarrier spacing (SCS), one or more cyclic prefix (CP) types, whether the data is supported, whether synchronization (synch) is supported, and a frequency range and/or subrange in which the communication nodes communicate for a given value of μ.

The value of ρ is an integer greater than or equal to zero. In some embodiments, μ is an integer in a range from zero to six, although values of μ greater than six may be possible.

In some embodiments, SCS may be a function of μ. An example function is SCS (also denoted as Δf)=2-15 [kHz]. In addition or alternatively, each μ may be associated with a different one of a plurality of SCS values. For at least some embodiments, SCS is on the order of kilohertz (kHz), non-limiting examples of which include: 15 kHz, 30 kHz, 60 kHz, 120 kHz, 240 kHz, 480 kHz, and 960 kHz.

In general, cyclic prefix (CP) refers to the prefixing of a symbol, with a repetition of the end. A CP may be part of a preamble used by a user device 102 to access a cell it has found, such as part of a random access procedure. For example, a communication node, to generate a preamble, may subject a preamble sequence to an orthogonal frequency division multiplexing (OFDM) modulator, the modulated sequence is repeated N times, and a CP is added to the block of N repeated symbols output, such that a CP is inserted once per block of N repeated symbols, rather than per OFDM symbol. In general, a preamble may have an associated guard time between the preamble and other signal transmissions to reduce or eliminate uncertainty that there are no other transmissions or uplink resources occurring during a preamble transmission, and/or to minimize intersymbol interference. With respect to a numerology, in some embodiments, a CP type may include "normal" and "extended". Extended cyclic prefix (ECP) may have, or be implemented with, a longer guard period between symbols compared to normal cyclic prefix (NCP). Additionally, downlink and uplink transmissions may be organized into frames. Each frame may have a certain duration, such as 10 milliseconds (ms) for example. In addition, a frame may include or be divided into a certain number of subframes. For example, one frame may be divided into ten subframes. Also, the subframes may have the same duration as each other. For example, one 10 ms frame may divided into 10 subframes, with each subframe being 1 ms in duration. In addition, each frame may be divided into two equally-sized half-frames. For example, a frame that includes ten subframes may be divided into two half-frames, where each half frame includes five subframes. Additionally, for at least some embodiments, a slot duration is 14 symbols with Normal CP and 12 symbols with Extended CP, and scales in time as a function of the used sub-carrier spacing so that there is always an integer number of slots in a subframe.

In addition, whether data is supported may indicate whether data (or data signals) can be communicated between communication nodes for a given p value. Also, whether synchronization is supported may indicate whether synchronization signals (e.g., primary synchronization signal (PSS) and/or a secondary synchronization signal (SSS)) can be communicated between communication nodes for a given p value. Table 2 below shows an example set of numerologies for p values of zero to 6.

TABLE 2

Supported Transmission Numerologies

| μ | $\Delta f = 2^{\mu} \cdot 15$[kHz] | CP | Supported for data | Supported for synch | FR |
|---|---|---|---|---|---|
| 0 | 15 | Normal | Yes | Yes | FR1 |
| 1 | 30 | Normal | Yes | Yes | FR1 |
| 2 | 60 | Normal, Extended | Yes | No | FR1, FR2-1 |

TABLE 2-continued

| Supported Transmission Numerologies | | | | | |
|---|---|---|---|---|---|
| μ | $\Delta f = 2^{\mu} \cdot 15$[kHz] | CP | Supported for data | Supported for synch | FR |
| 3 | 120 | Normal | Yes | Yes | FR2-1,FR2-2 |
| 4 | 240 | Normal | No | Yes | FR2-1 |
| 5 | 480 | Normal | Yes | Yes | FR2-2 |
| 6 | 960 | Normal | Yes | Yes | FR2-2 |

As indicated in Table 2, for some embodiments, communicating with a 120 kHz SCS (ρ=3) is not performed in FR1. However, communicating with a 120 kHz SCS in FR1 may be desirable in any of various applications, such as business (ToB) scenarios, user equipment (UE)-specific applications like RedCap, and/or to achieve low latency reduction needs or requirements in FR1. Accordingly, the following describes embodiments of communication nodes communicating with a 120 kHz SCS in FR1.

Figure 2:
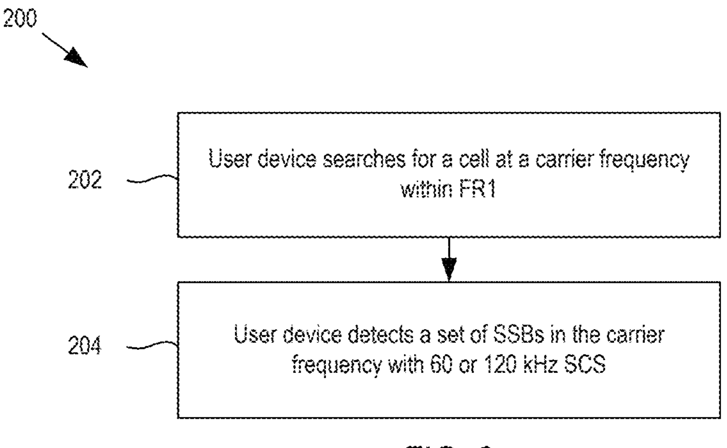
FIG. 2 is a flow chart of an example method for wireless communication.

FIG. 2 shows a flow chart of an example method 200 of wireless communication that involves communicating with 120 kHz SCS in FR1. At block 202, a user device 102 may search for a cell at a carrier frequency within FR1. For example, the user device 102 may search or look for a cell when it enters a coverage area of a wireless communication system 100 or is looking for a new cell when moving within a current system 100. The user device 102 may search for cell so that it can gain access to it, and in turn, communicate data or other signals with a network device 104 in the wireless communication system 100. The searching performed at block 202 may be part of a cell search procedure where the user device 102 acquires time and frequency synchronization with a cell and detects a physical layer cell identification (ID) of that cell. Once the user device 102 has accessed the cell, the user device 102 may be in a connected state and communicate data or other signals with the network device 104. At block 204, the user device 102, the user device 102 may detect a set of synchronization signal (SS) and physical broadcast channel (PBCH) blocks (also called SS/PBCH blocks or SSB) in the carrier frequency with a 60 kHz subcarrier spacing (SCS) or a 120 kHz SCS. The user device 102 may perform the detection upon, in response to, and/or after receiving the set of SSBs. Also, the user device 102 may receive the set of SSBs from the network device 104.

Figure 3:
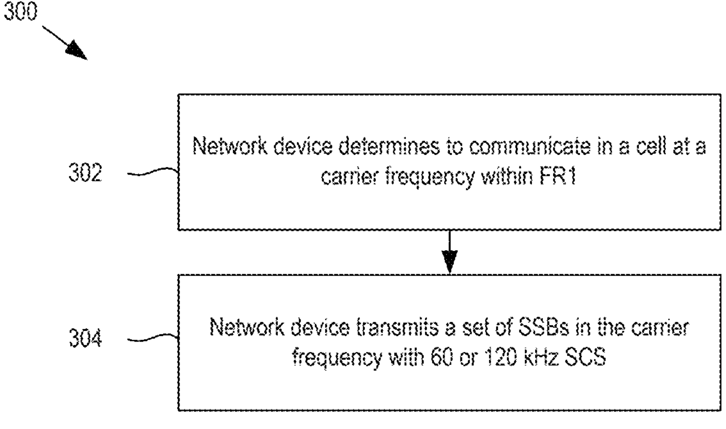
FIG. 3 is a flow chart of an example method for wireless communication.

FIG. 3 shows a flow chart of another example method 300 of wireless communication that involves communicating with 120 kHz SCS in FR1. At block 302, the network device 104 may determine to communicate in a cell at a carrier frequency within FR1. At block 304, the network device 104 may transmit a set of SSBs in the carrier frequency within FR1 with a 60 kHz SCS or a 120 kHz SCS.

In some embodiments of the method 200 and/or the method 300, the set of SSBs is communicated with the 60 kHz SCS, a number of SSBs in a half frame is eight, and a first symbol index of each SSB in the half frame is {2, 8, 16, 22, 30, 36, 44, 50}. In general, as used herein, a first symbol index defines a location in a slot where a first symbol of a SSB is transmitted, where first symbol index 0 is the first symbol of the first slot in a half frame. For example, a first symbol index of 2 of a given SSB to be transmitted in a given half frame indicates that the first symbol of the given SSB is transmitted in the third symbol of the first slot of the given half frame.

In addition or alternatively, in some embodiments of the method 200 and/or the method 300, the set of SSBs is communicated with the 120 kHz SCS, a number of SSBs in a half frame is 64, and a first symbol index of each SSB in the half frame is {8, 12, 16, 20, 32, 36, 40, 44, 64, 68, 72, 76, 88, 92, 96, 100}+140*n, where n=0, 1, 2, and 3.

In addition or alternatively, in some embodiments of the method 200 and/or the method 300, the set of SSBs is communicated with the 120 kHz SCS and with an extended cyclic prefix (ECP). In some of these embodiments, a number of the SSBs in a half frame is 64, and a first symbol index of each SSB in the half frame is {4, 8, 16, 20}+24*n, where n=0, 1, 2, 3, 5, 6, 7, 8, 10, 11, 12, 13, 15, 16, 17, and 18. In other of these embodiments, the number of SSBs transmitted in a half frame is 64, and a first symbol index of each SSB in the half frame is {2, 8, 14, 20}+24*n, where n=0, 1, 2, 3, 5, 6, 7, 8, 10, 11, 12, 13, 15, 16, 17, and 18.

In addition or alternatively, in some embodiments of the method 200 and/or the method 300, the 120 kHz SCS is supported for common data, and a reused current 1 bit in a master information block (MIB) indicates one of two candidate values for a SCS for the common data when the set of SSBs with the 120 kHz SCS or the 60 kHz SCS is detected. The two candidate values include at least 120 kHz.

In addition or alternatively, in some embodiments of the method 200 and/or the method 300, the 120 kHz SCS is supported for common data, and a reused current 1 bit and a reserved 1 bit in a master information block (MIB) indicates one of three or four candidate values. The three or four candidate values include at least 120 kHz.

In addition or alternatively, in some embodiments of the method 200 and/or the method 300, the 120 kHz SCS is supported for common data, and when a SSB with a 15 kHz SCS is detected, a subcarrier offset from subcarrier 0 in a common resource block to a subcarrier 0 of a SSB includes seven bits, wherein four of the seven bits are from a frequency offset value in a master information block (MIB), and three of the seven bits are from a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device 104 and a spare bit located in the payload that is added by a higher layer of the network device 104. The higher layer is a layer higher than the physical layer (PHY).

In addition or alternatively, in some embodiments of the method 200 and/or the method 300, the 120 kHz SCS is supported for common data, and when a SSB with a 30 kHz SCS is detected, or the 60 kHz SCS is supported for the common data and when a SSB with a 15 kHz SCS is detected, a subcarrier offset from subcarrier 0 in a common resource block to a subcarrier 0 of a SSB includes 6 bits, where four of the seven bits are from a frequency offset value in a master information block (MIB), and two of the six bits are from a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device 104 and a spare bit located in the payload that is added by a higher layer of the network device 104.

Embodiment 1

In some embodiments, only data signals with 120 kHz SCS in FR1 are communicated. That is, 120 kHz SCS may not be used for synchronization signals. In other embodiments, data and synchronization signals with 60 kHz or 120 kHz SCS may be communicated, which may allow for communication nodes to support extended cyclic prefix (ECP) for 120 kHz SCS data, similar to how ECP for 60 kHz SCS is supported; and/or a 30 kHz and/or 60 kHz SSB pattern may be used, which may optimally match with data communicated with 120 kHz SCS.

In addition, for embodiments where ECP is used for 120 kHz SCS, there may be twelve (12) OFDM symbols in one slot.

Figure 4:
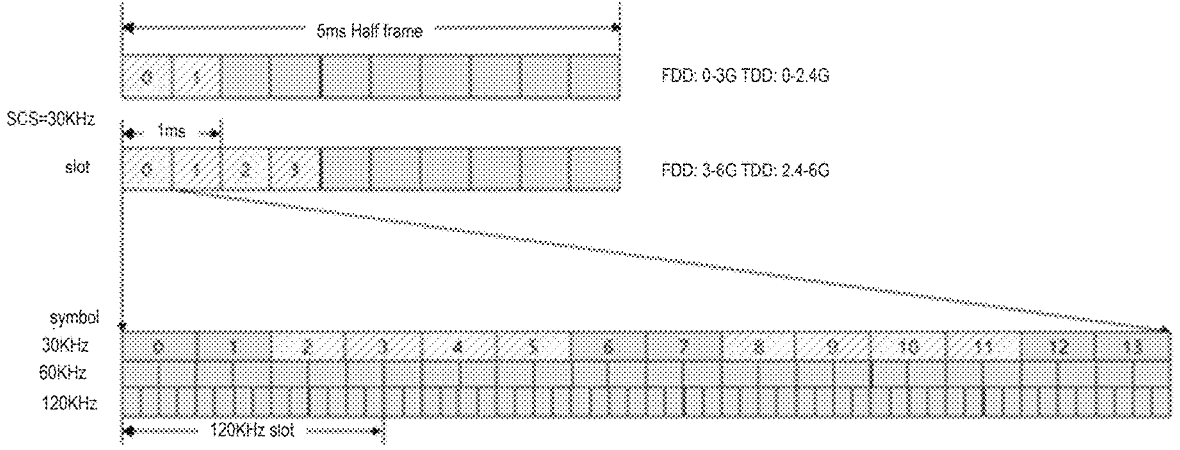
FIG. 4 is a diagram of a synchronization signal and physical broadcast channel block (SSB) pattern having a 30 kilohertz (kHz) subcarrier spacing (SCS).

Also, for some embodiments, communicating data in FR1 with 120 kHz SCS may use an SSB pattern having a 30 kHz SCS (e.g., SSBs are communicated with a 30 kHz SCS). Four symbols communicated with a 30 kHz SCS corresponds to sixteen symbols communicated with a 120 kHz SCS. FIG. 4 shows a diagram of a Case C SSB pattern having a 30 kHz SCS, where an SSB with 30 kHz SCS is used to multiplex with data with 60 kHz SCS. Such a configuration may also be used to multiplex a SSB with 30 kHz SCS with data with 120 kHz SCS. For such configurations, in some embodiments, the first symbol index S of each SSB within a half frame (e.g., a 5 millisecond (ms) half frame) is: S={2, 8, 16, 22, 30, 36, 44, 50}; and the number L of SSBs within a half frame is eight (i.e., L=8), for frequency-division duplex (FDD) 3-6 GHz, and for a time-division duplex (TDD) of 2.4-6 GHz. In other embodiments, the first symbol index S={2, 8, 16, 22}, and the number L of SSBs within a half frame is four (i.e., L=4), for FDD of 0-3 GHz, and for TDD of 0-2.4 GHz.

Figure 5:
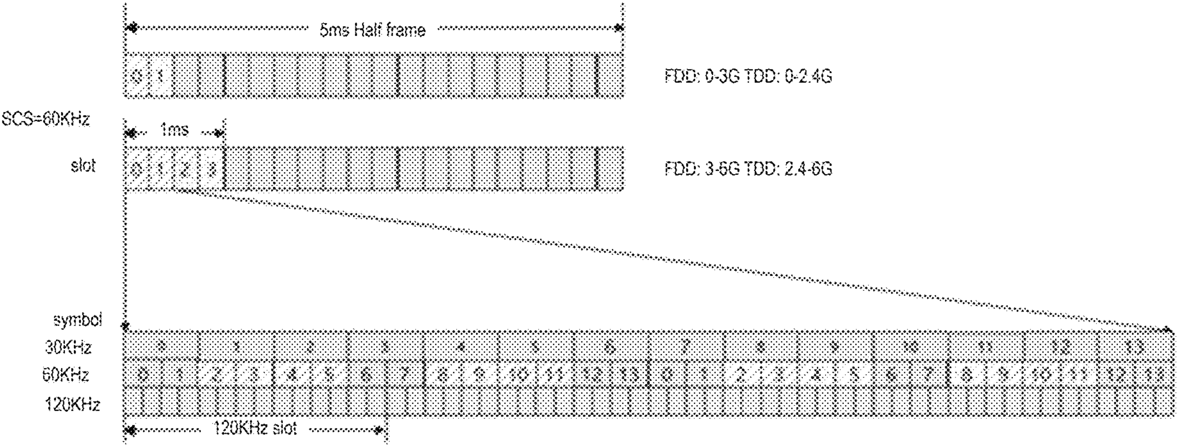
FIG. 5 is a diagram of a SSB pattern having a 60 kHz SCS.

In other embodiments, communicating in FR1 with 120 kHz SCS may use a SSB pattern having a 60 kHz SCS. FIG. 5 shows a diagram of a SSB pattern having a 60 kHz SCS. As shown in FIG. 5, a SSB with a 60 kHz SCS may be multiplexed with data with a 120 kHz SCS. For such configurations, in some embodiments, the first symbol index of each SSB within a half frame (e.g., a 5 ms half frame) is S={2, 8, 16, 22, 30, 36, 44, 50}, and number L of SSBs within the half frame is eight (i.e., L=8), for FDD of 3-6 GHz, and TDD of 2.4-6 GHz. In other embodiments, the first symbol index S={2, 8, 16, 22}, and the number L of SSBs within a half frame is four (i.e., L=4), for FDD of 0-3 GHz, and TDD of 0-2.4 GHz.

In other embodiments, the number L of SSBs with a 60 kHz SCS that are within a half frame is larger than 8. For example, L=16, 24, 32, or 40. For example, S={2, 8, 16, 22, 30, 36, 44, 50}+n*56, n=0, 1; and L=16. As another example, S={2, 8, 16, 22, 30, 36, 44, 50}+n*56, n=0, 1, 2; and L=24. As another example, S={2, 8, 16, 22, 30, 36, 44, 50}+n*56, n=0, 1, 2, 3; and L=32. As another example, S={2, 8, 16, 22}+n*28, n=0, 1, 2, 3, 5, 6, 7, 8; and L=32. As another example, S={2, 8, 16, 22, 30, 36, 44, 50}+n*56, n=0, 1, 2, 3, 4; and L=40.

In some embodiments, 120 kHz SCS in FR1 is used only for communicating data, and a SSB pattern having 60 kHz SCS may provide an optimal match with control channel or data with 120 kHz SCS.

Embodiment 2

In addition or alternatively, in some embodiments, both data and synchronization signals are communicated with 120 kHz SCS in FR1.

For embodiments where communication with 120 kHz SCS and with ECP is performed, there may be twelve OFDM symbols in one slot.

Figure 6:
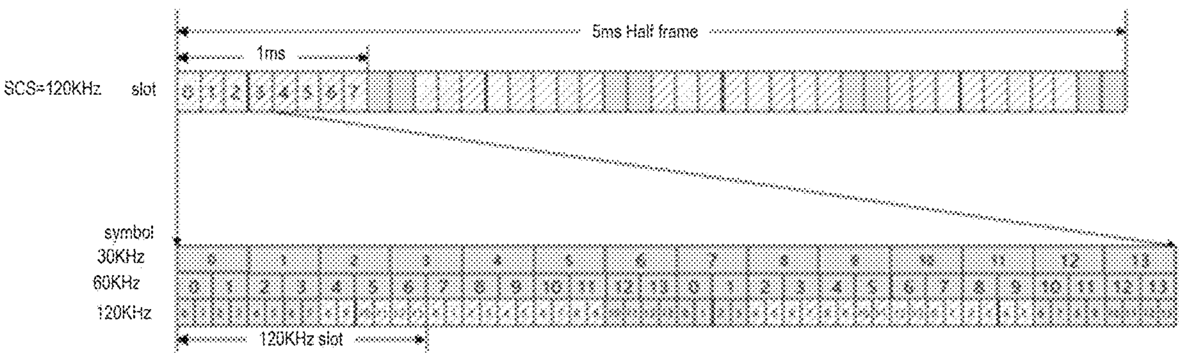
FIG. 6 is a diagram of a SSB pattern having a 120 kHz SCS.

Also, where SSBs are communicated in FR1 with 120 kHz SCS, the number of SSBs within a half frame (e.g., a 5 ms half frame) is eight or sixty-four (i.e., L=8 or 64). FIG. 6 shows a diagram of an SSB pattern having 120 kHz SCS. As shown in FIG. 6, SSBs with 120 kHz SCS may be multiplexed with data with 30 kHz SCS. For such configurations, in some embodiments, the first symbol index S of each SSB within a half frame is: S=8, 12, 16, 20, 32, 36, 40, 44, 64, 68, 72, 76, 88, 92, 96, 100}+140*n, n=0, 1, 2, 3; and the number L of SSB in a half frame is sixty-four (i.e., L=64).

In addition or alternatively, in some embodiments, the number L of SSBs with a 120 kHz SCS within a half frame is L=8. For example, S={8, 12, 16, 20, 32, 36, 40, 44}; and L=8. In the example shown in FIG. 6, the eight SSBs may be the first eight SSBs shown.

In addition or alternatively, in some embodiments, the number L of SSBs with a 120 kHz SCS within a half frame is eight (i.e., L=8). For example, S={4, 8, 16, 20, 32, 36, 44, 48}; and L=8. In addition or alternatively, the first eight SSBs in a Legacy Case D 120 kHz SCS SSB pattern with L=64 may have a first symbol index S={4, 8, 16, 20}+28*n, n=0, 1, 2, 3, 5, 6, 7, 8, 10, 11, 12, 13, 15, 16, 17, 18.

Additionally, in some embodiments, both data and synchronization signals may be communicated in FR1 with a 120 kHz SCS. For such embodiments, a SSB pattern having a 120 kHz SCS may be used to match with control channel or data with 30 kHz SCS.

Embodiment 3

In addition or alternatively, both data and synchronization signals may be communicated in FR1 with 120 kHz SCS.

Additionally, for communication with 120 kHz SCS and with ECP, there may be twelve OFDM symbols in one slot.

Figure 7:
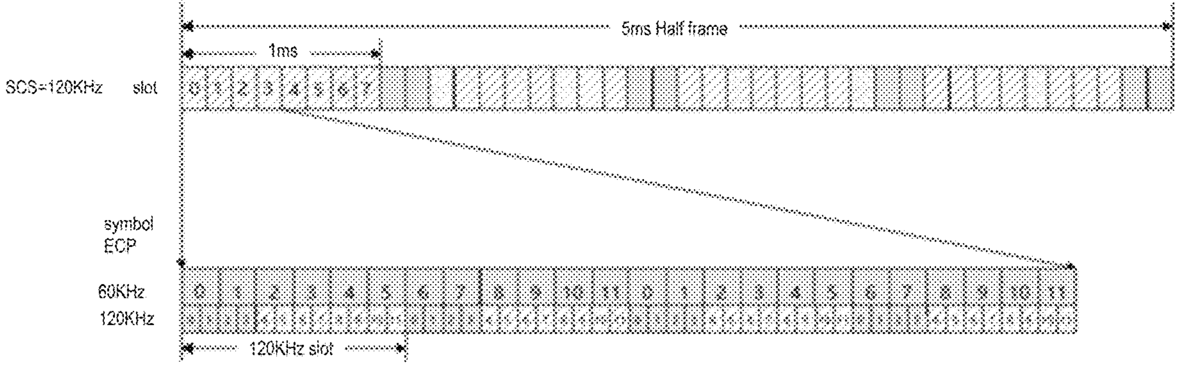
FIG. 7 is a diagram of a SSB pattern having a 120 kHz SCS and extended cyclic prefix (ECP).

In addition or alternatively, in some embodiments, SSBs may be communicated in FR1 with a 120 kHz SCS and with ECP. For at least some of these embodiments, the number of SSBs within a half frame (e.g., a 5 ms half frame) may be eight or sixty-four (i.e., L=8 or 64). FIG. 7 shows a diagram of a SSB pattern having 120 kHz SCS and ECP. For such configurations, the first symbol index S of each SSB within a half frame (e.g., a 5 ms half frame) is S={4, 8, 16, 20}+24*n, n=0, 1, 2, 3, 5, 6, 7, 8, 10, 11, 12, 13, 15, 16, 17, 18; and the number L of SSBs within a subframe is sixty-four (i.e., L=64).

In addition or alternatively, in some embodiments, the number L of SSB with 120 kHz SCS in a half frame is eight (i.e., L=8). For example, S={4, 8, 16, 20, 28, 32, 40, 44}; and L=8. For example, in the example configuration in FIG. 7, the eight SSBs may be the first 8 SSBs shown.

Figure 8:
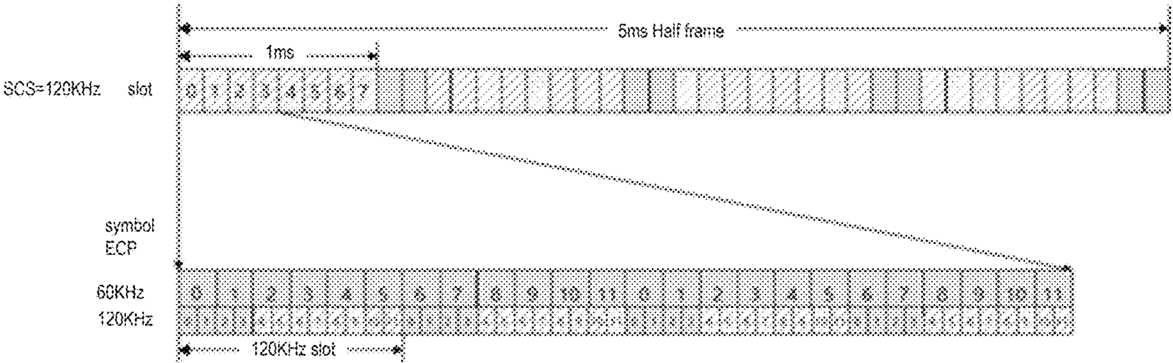
FIG. 8 is a diagram of a SSB pattern having a 120 kHz SCS and ECP.

In addition or alternatively, for embodiments having an SSB pattern with a 120 kHz SCS and with ECP in FR1, the number L of SSBs in a half frame may be eight or sixty-four (i.e., L=8 or 64). FIG. 8 shows a diagram of a SSB pattern having a 120 kHz SCS and ECP. As shown in FIG. 8, a SSB with 120 kHz SCS may be multiplexed with data with 60 or 120 kHz SCS and with ECP. As an example, the first symbol index S of reach SSB within a half frame (e.g., a 5 ms half frame) is S={2, 8, 14, 20}+24*n, n=0, 1, 2, 3, 5, 6, 7, 8, 10, 11, 12, 13, 15, 16, 17, 18; and the number L of SSBs within the half frame is sixty-four (L=64).

In addition or alternatively, the number L of SSBs within a half frame is eight (i.e., L=8), and the first symbol index S of SSBs in the half frame is: S={2, 8, 14, 20, 26, 32, 38, 44}. In the example in FIG. 8, the eight SSBs may be the first eight SSBs shown.

Additionally, in some embodiments, both data and synchronization signals are communicated with a 120 kHz SCS. A SSB pattern having a 120 kHz SCS and ECP may be used to match with control channel or data with 60 or 120 kHz SCS and with ECP.

Embodiment 4

In some embodiments, SCS 120 KHz SCS may be used and/or supported for common data, such as system information block 1 (SIB1), Msg.2/4 and MsgB for initial access, paging and broadcast SI-messages.

In some embodiments, 1 bit in a master information block (MIB) is used to indicate one SCS value used for common data. For example, the information element subCarrierSpacingCommon may be used to indicate subcarrier spacing for SIB1, Msg.2/4 and MsgB for initial access, paging and broadcast SI-messages. If the user device 102 acquires this MIB on an FR1 carrier frequency, the value scs15 or 60 may correspond to 15 kHz, and the value scs30 or 120 may correspond to 30 kHz. If the user device 102 acquires this MIB on an FR2 carrier frequency, the value scs15 or 60 may correspond to 60 kHz and the value scs30 or 120 may correspond to 120 kHz. For operation with shared spectrum channel access in FR1 and for operation in FR2-2, the subcarrier spacing for SIB1, Msg.2/4 and MsgB for initial access, paging and broadcast SI-messages may be the same as that for the corresponding SSB. For operation with shared spectrum channel access, this field may instead be used for deriving the quasi co-location (QCL) relation between SSBs.

For embodiments where SSBs are communicated with a 60 or 120 kHz SCS and the number L of SSBs in a half frame is eight (i.e., L=8), potential or candidate SCSs for common data that may be indicated may include one or more of the following alternative SCS value candidates: Alternative 1: 30 kHz or 120 kHz; Alternative 2: 15 kHz or 120 kHz; Alternative 3: 15 kHz, 30 kHz, or 120 kHz; or Alternative 4: 15 kHz, 30 kHz, 60 kHz, or 120 kHz. In some embodiments, for Alternative 1 or Alternative 2, a current 1 bit in the MIB may be reused to indicate one of the two candidate values if SSBs with 60 kHz or 120 kHz SCS in FR1 is detected. In addition or alternatively, in some embodiments, for Alternative 3 or Alternative 4, a reused current 1 bit in the MIB and another, reserved 1 bit may be used to indicate one of the three or four candidate values. In particular of these embodiments, the reserved 1 bit is one of: $\bar{a}_{\bar{A}+6}$ $\bar{a}_{\bar{A}+7}$, or a spare bit, where $\bar{a}_{\bar{A}+6}$ and $\bar{a}_{\bar{A}+7}$ are seventh and eighth bits, respectively, of MIB information (or a payload of a physical broadcast channel (PBCH)) added by a physical layer (PHY) of the network device 104, and the spare bit is a bit located in the payload of the PBCH added by a higher layer of the network device 104, where the higher layer is a layer that is higher than the physical layer, such as the media access control (MAC) layer, the radio link control (RLC) layer, the packet data convergence protocol (PDCP) layer, or the radio resource control (RRC) layer, as non-limiting examples.

Also, for embodiments where the SSBs are communicated with 120 kHz SCS and the number L of SSBs in a half frame is sixty-four (i.e., L=64), the SCS for common data may be indicated according to one or more of the following alternative SCS value candidates: Alternative 1: 30 kHz or 120 kHz; Alternative 2: 15 kHz or 120 kHz; Alternative 3: 15 kHz, 30 kHz, or 120 kHz; or Alternative 4: 15 kHz, 30 kHz, 60 kHz, or 120 kHz. In some embodiments, for Alternative 1 or Alternative 2, a current 1 bit in the MIB may be reused to indicate one of the two candidate values if SSBs with 120 kHz SCS in FR1 is detected. For Alternative 3 or Alternative 4, a reused current 1 bit in the MIB and another reserved 1 bit may be used to indicate one of the three or four candidate values. For at least some of these embodiments, the reserved 1 bit is one of: $\bar{a}_{\bar{A}+6}$, $\bar{a}_{\bar{A}+7}$, or a spare bit, where $\bar{a}_{\bar{A}+6}$ and $\bar{a}_{\bar{A}+7}$ are the seventh and eighth bits, respectively, of MIB information (or the PBCH payload) that is added by the physical layer (PHY) of the network device 104, and the spare bit is a spare bit of the PDCH payload added by the higher layer.

In addition or alternatively, for embodiments where SSBs are communicated with 120 kHz SCS, the subcarrier spacing for SIB1, Msg.2/4 and MsgB for initial access, paging and broadcast SI-messages may be the same as that for the corresponding SSB if the SSB with 120 kHz in FR1 is detected.

Additionally, 120 kHz SCS in FR1 may be used and/or supported for common data. In some of these embodiments, more than two potential candidate values of SCS for common data may be indicated. Such embodiments may allow for user devices 102 with different capabilities to support shared common data with legacy 30 kHz SCS.

Embodiment 5

In addition or alternatively, for embodiments where common data (such as SIB1, Msg.2/4 and MsgB for initial access, paging and broadcast SI-messages) with 120 kHz SCS, a value for $k_{SSB}$ may be indicated, where $k_{SSB}$ is the subcarrier offset from subcarrier 0 in common resource block $$N_{CRB}^{SSB}$$

to subcarrier 0 of the SS/PBCH block. In some embodiments, $$N_{CRB}^{SSB}$$

is obtained from the higher-layer parameter offsetToPointA. For SS/PBCH block type A, $\mu \in \{0,1\}$ and $k_{SSB} \in \{0, 1, 2, \ldots, 23\}$ with the quantities $k_{SSB}$, and $$N_{CRB}^{SSB}$$

expressed in terms of 15 kHz subcarrier spacing, and for SS/PBCH block type B in FR2-1, $\mu \in \{3,4\}$ and $k_{SSB} \in \{0, 1, 2, \ldots, 11\}$ with the quantity $k_{SSB}$ expressed in terms of the subcarrier spacing provided by the higher-layer parameter subCarrierSpacingCommon and $$N_{CRB}^{SSB}$$

expressed in terms of 60 kHz subcarrier spacing. For embodiments where $k_{SSB} \in \{0, 1, 2 \ldots 11\}$, 4 bits of a frequency offset value (e.g., ssb-SubcarrierOffset) in the MIB may be used to indicate $k_{SSB}$. In addition or alternatively, for embodiments where $k_{SSB} \in \{0, 1, 2, \ldots, \mathbf{23}\}$, five bits may be used to indicate $k_{SSB}$, where four of the five bits may include 4 bits of a frequency offset value (e.g., ssb-SubcarrierOffset) in the MIB and one of the five bits may be one bit in the MIB that is added by the physical layer of the network device 105, such as $\bar{a}_{\bar{A}+5}$, which is the 6th bit of MIB information added by the physical layer of the network device 104.

In addition or alternatively, where 120 kHz SCS is supported by common data, and the 120 kHz SCS for the common data is to be indicated by SSB with 15 kHz SCS, at most 96 states or different values may be indicated by a seven bit value of $k_{SSB}$. In some of these embodiments, four of the seven bits may be from 4 bits of a frequency offset value (e.g., ssb-SubcarrierOffset) in the MIB, and the other three bits may be from one of following combinations of $\bar{a}_{\bar{A}+5}$, $\bar{a}_{\bar{A}+6}$, $\bar{a}_{\bar{A}+7}$, and the spare bit: Combination 1: $\bar{a}_{\bar{A}+5}$, $\bar{a}_{\bar{A}+6}$, $\bar{a}_{\bar{A}+7}$; $\bar{a}_{\bar{A}+6}$, $\bar{a}_{\bar{A}+7}$, spare bit; Combination 2: $\bar{a}_{\bar{A}+5}$, $\bar{a}_{\bar{A}+7}$, spare bit; Combination 3: $\bar{a}_{\bar{A}+5}$, $\bar{a}_{\bar{A}+6}$, spare bit.

In addition or alternatively, in some embodiments where 120 kHz SCS for common data is to be indicated by a SSB with 30 kHz SCS, or 60 kHz SCS for common data is to be indicated by a SSB with 15 kHz SCS, and no requirement of 120 kHz SCS for common data is indicated by SSB with 15 kHz SCS, then at most 48 possible states or values may be indicated via six bits of $k_{SSB}$. Four of the six bits may be from a frequency offset value (e.g., ssb-SubcarrierOffset) in MIB, and the other two of the six bits may be from one of the following combination of: $\bar{a}_{\bar{A}+5}$, $\bar{a}_{\bar{A}+6}$, $\bar{a}_{\bar{A}+7}$ and the spare bit: $\bar{a}_{\bar{A}+5}$, $\bar{a}_{\bar{A}+6}$; $\bar{a}_{\bar{A}+6}$, $\bar{a}_{\bar{A}+7}$; $\bar{a}_{\bar{A}+5}$, $\bar{a}_{\bar{A}+7}$; $\bar{a}_{\bar{A}+5}$, spare bit; $\bar{a}_{\bar{A}+6}$, spare bit; or $\bar{a}_{\bar{A}+7}$, spare bit.

In addition or alternatively, for embodiments where SSB is communicated in FR1 with 120 kHz. If the SCS for common data can be 15 KHz, 30 KHz, 60 KHz, or 120 KHz, $k_{SSB} \in \{0, 1, 2, \ldots, 11\}$, which may be indicated using four bits. In some of these embodiments, the four bits of ssb-SubcarrierOffset in the MIB is used for or to indicate the 4 bits of $k_{SSB}$.

Additionally, for embodiments where 120 kHz SCS in FR1 is used or supported for common data, at most seven bits may be used to indicate $k_{SSB}$. This may allow user devices 102 with different capabilities to support shared SSB with 15 kHz or 30 kHz SCS.

The description and accompanying drawings above provide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not necessarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The subject matter of the disclosure may also relate to or include, among others, the following aspects:

A first aspect includes a method for wireless communication that includes: searching, by a user device, for a cell at a carrier frequency within frequency range 1 (FR1); and detecting, by the user device, a set of synchronization signal and physical broadcast channel blocks (SSBs) in the carrier frequency with a subcarrier spacing (SCS) of 60 kilohertz (kHz) or 120 kHz.

A second aspect includes a method for wireless communications that includes: determining, by a network device, to communicate in a cell at a carrier frequency within frequency range 1 (FR1); and transmitting, by the network device, a set of synchronization signal and physical broadcast channel blocks (SSBs) in the carrier frequency within FR1 with a subcarrier spacing (SCS) of 60 kilohertz (kHz) or 120 kHz.

A third aspect includes any of the first or second aspects, and further includes wherein the SCS of the set of SSBs is 60 kHz; a number of the SSBs in a half frame is 8; and a first symbol index of each SSB in the half frame is {2, 8, 16, 22, 30, 36, 44, 50}.

A fourth aspect includes any of the first or second aspects, and further includes wherein the SCS of the set of SSBs is 120 kHz; a number of the SSBs in a half frame is 64; and a first symbol index of each SSB in the half frame is {8, 12, 16, 20, 32, 36, 40, 44, 64, 68, 72, 76, 88, 92, 96, 100}+140*n, where n=0, 1, 2, and 3.

A fifth aspect includes any of the first or second aspects, and further includes wherein the SCS of the set of SSBs is 120 kHz and combined with an extended cyclic prefix (ECP); a number of the SSBs in a half frame is 64; and a first symbol index of each SSB in the half frame is {4, 8, 16, 20}+24*n, where n=0, 1, 2, 3, 5, 6, 7, 8, 10, 11, 12, 13, 15, 16, 17, and 18.

A sixth aspect includes any of the first or second aspects, and further includes wherein the SCS of the set of SSBs is 120 kHz and combined with an extended cyclic prefix (ECP); a number of the SSBs in a half frame is 64; and a first symbol index of each SSB in the half frame is {2, 8, 14, 20}+24*n, where n=0, 1, 2, 3, 5, 6, 7, 8, 10, 11, 12, 13, 15, 16, 17, and 18.

A seventh aspect includes any of the first through sixth aspects, and further includes wherein a SCS of 120 kHz is supported for common data, and a reused current 1 bit in a master information block (MIB) indicates one of two candidate values for the SCS for the common data when the SCS of the set of SSBs is detected to be 120 kHz or 60 kHz, wherein the two candidate values comprise at least 120 kHz.

An eighth aspect includes any of the first through sixth aspects, and wherein a SCS of 120 kHz is supported for common data, and a reused current 1 bit and a reserved 1 bit in a master information block (MIB) indicate one of three or four candidate values, wherein the three or four candidate values comprise at least 120 kHz.

A ninth aspect includes any of the first through eighth aspects, and further includes wherein a SCS of 120 kHz is supported for common data, and when a SSB with a 15 kHz SCS is detected: a subcarrier offset from subcarrier 0 in a common resource block to a subcarrier 0 of a SSB comprises seven bits, wherein four of the seven bits are from a frequency offset value in a master information block (MIB) and three of the seven bits are from: a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device, or two of the last three bits $\bar{a}_{\bar{A}+5}$, $\bar{a}_{\bar{A}+6}$, $\bar{a}_{\bar{A}+7}$ and a spare bit located in the payload that is added by a higher layer of the network device.

A tenth aspect includes any of the first through eighth aspects, and further includes wherein a SCS of 120 kHz is supported for common data, and when a SSB with a 30 kHz SCS is detected, or a SCS of 60 kHz is supported for the common data and when a SSB with a 15 kHz SCS is detected: a subcarrier offset from subcarrier 0 in a common resource block to a subcarrier 0 of a SSB comprises six bits, wherein four of the six bits are from a frequency offset value in a master information block (MIB) and two of the six bits are from two of a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device, or one of the last three bits $\bar{a}_{\bar{A}+5}$, $\bar{a}_{\bar{A}+6}$, $\bar{a}_{\bar{A}+7}$ and a spare bit located in the payload that is added by a higher layer of the network device.

An eleventh aspect includes a wireless communications apparatus that includes a processor and a memory, wherein the processor is configured to read code from the memory to implement any of the first through tenth aspects.

A twelfth aspect includes a computer program product comprising a computer-readable program medium comprising code stored thereupon, the code, when executed by a processor, causing the processor to implement any of the first through tenth aspects.

In addition to the features mentioned in each of the independent aspects enumerated above, some examples may show, alone or in combination, the optional features mentioned in the dependent aspects and/or as disclosed in the description above and shown in the figures.

The invention claimed is:

1. A method for wireless communication, the method comprising:

searching, by a user device, for a cell at a carrier frequency within frequency range 1 (FR1); and detecting, by the user device, a set of synchronization signal and physical broadcast channel blocks (SSBs) in the carrier frequency with a subcarrier spacing (SCS) of 120 kHz, wherein the SCS of the set of SSBs is 120 kHz, or is 120 kHz and combined with an extended cycle prefix (ECP), wherein a number of the SSBs in a half frame is 64, and wherein a first symbol index of each SSB in the half frame is {8, 12, 16, 20, 32, 36, 40, 44, 64, 68, 72, 76, 88, 92, 96, 100}+140*n, where n=0, 1, 2, and 3, or when the SCS is combined with an extended cycle prefix, the first symbol index of each SSB in the half frame is: {4, 8, 16, 20}+24*n, or {2, 8, 14, 20}+24*n, where n=0, 1, 2, 3, 5, 6, 7, 8, 10, 11, 12, 13, 15, 16, 17, and 18.

2. The method of claim 1, wherein the SCS of 120 kHz is supported for common data, and a reused current 1 bit in a master information block (MIB) indicates one of two candidate values for the SCS for the common data when the SCS of the set of SSBs is detected to be 120 kHz or 60 kHz, wherein the two candidate values comprise at least 120 kHz.

3. The method of claim 1, wherein the SCS of 120 kHz is supported for common data, and a reused current 1 bit and a reserved 1 bit in a master information block (MIB) indicate one of three or four candidate values, wherein the three or four candidate values comprise at least 120 kHz.

4. The method of claim 1, wherein the SCS of 120 kHz is supported for common data, and when a SSB with a 15 kHz SCS is detected:

a subcarrier offset from subcarrier 0 in a common resource block to a subcarrier 0 of a SSB comprises seven bits, wherein four of the seven bits are from a frequency offset value in a master information block (MIB) and three of the seven bits are from:

a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device; or two of the last three bits $\bar{a}_{\bar{A}+5}$, $\bar{a}_{\bar{A}+6}$, $\bar{a}_{\bar{A}+7}$ and a spare bit located in the payload that is added by a higher layer of the network device.

5. The method of claim 1, wherein the SCS of 120 kHz is supported for common data and when a SSB with a 30 kHz SCS is detected, or a SCS of 60 kHz is supported for the common data and when a SSB with a 15 kHz SCS is detected:

a subcarrier offset from subcarrier 0 in a common resource block to a subcarrier 0 of a SSB comprises six bits, wherein four of the six bits are from a frequency offset value in a master information block (MIB) and two of the six bits are from:

two of a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device; or one of the last three bits $\bar{a}_{\bar{A}+5}$, $\bar{a}_{\bar{A}+6}$, $\bar{a}_{\bar{A}+7}$ and a spare bit located in the payload that is added by a higher layer of the network device.

6. A wireless communications apparatus comprising:

a memory storing a plurality of instructions; and a processor configured execute the plurality of instructions, wherein upon execution of the plurality of instructions, the processor is configured to cause the apparatus to:

search for a cell at a carrier frequency within frequency range 1 (FR1); and detect a set of synchronization signal and physical broadcast channel blocks (SSBs) in the carrier frequency with a subcarrier spacing (SCS) of 120 kHz, wherein the SCS of the set of SSBs is 120 kHz, or is 120 kHz and combined with an extended cycle prefix (ECP), wherein a number of the SSBs in a half frame is 64, and wherein a first symbol index of each SSB in the half frame is {8, 12, 16, 20, 32, 36, 40, 44, 64, 68, 72, 76, 88, 92, 96, 100}+140*n, where n=0, 1, 2, and 3, or when the SCS is combined with an extended cycle prefix, the first symbol index of each SSB in the half frame is:

{4, 8, 16, 20}+24*n, or

{2, 8, 14, 20}+24*n, where n=0, 1, 2, 3, 5, 6, 7, 8, 10, 11, 12, 13, 15, 16, 17, and 18.

7. The apparatus of claim 6, wherein the SCS of 120 kHz is supported for common data, and a reused current 1 bit in a master information block (MIB) indicates one of two candidate values for the SCS for the common data when the SCS of the set of SSBs is detected to be 120 kHz or 60 kHz, wherein the two candidate values comprise at least 120 kHz.

8. The apparatus of claim 6, wherein the SCS of 120 kHz is supported for common data, and a reused current 1 bit and a reserved 1 bit in a master information block (MIB) indicate one of three or four candidate values, wherein the three or four candidate values comprise at least 120 kHz.

9. The apparatus of claim 6, wherein the SCS of 120 kHz is supported for common data, and when a SSB with a 15 kHz SCS is detected:

a subcarrier offset from subcarrier 0 in a common resource block to a subcarrier 0 of a SSB comprises seven bits, wherein four of the seven bits are from a frequency offset value in a master information block (MIB) and three of the seven bits are from:

a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device; or two of the last three bits $\bar{a}_{\bar{A}+5}$, $\bar{a}_{\bar{A}+6}$, $\bar{a}_{\bar{A}+7}$ and a spare bit located in the payload that is added by a higher layer of the network device.

10. The apparatus of claim 6, wherein the SCS of 120 kHz is supported for common data and when a SSB with a 30 kHz SCS is detected, or a SCS of 60 kHz is supported for the common data and when a SSB with a 15 kHz SCS is detected:

a subcarrier offset from subcarrier 0 in a common resource block to a subcarrier 0 of a SSB comprises six bits, wherein four of the six bits are from a frequency offset value in a master information block (MIB) and two of the six bits are from:

two of a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device; or one of the last three bits $\bar{a}_{\bar{A}+5}$, $\bar{a}_{\bar{A}+6}$, $\bar{a}_{\bar{A}+7}$ and a spare bit located in the payload that is added by a higher layer of the network device.

11. A method for wireless communications, the method comprising:

determining, by a network device, to communicate in a cell at a carrier frequency within frequency range 1 (FR1); and transmitting, by the network device, a set of synchronization signal and physical broadcast channel blocks (SSBs) in the carrier frequency within FR1 with a subcarrier spacing (SCS) of 120 kHz, wherein the SCS of the set of SSBs is 120 kHz, or is 120 kHz and combined with an extended cycle prefix (ECP), wherein a number of the SSBs in a half frame is 64, and wherein a first symbol index of each SSB in the half frame is {8, 12, 16, 20, 32, 36, 40, 44, 64, 68, 72, 76, 88, 92, 96, 100}+140*n, where n=0, 1, 2, and 3, or when the SCS is combined with an extended cycle prefix, the first symbol index of each SSB in the half frame is:

{4, 8, 16, 20}+24*n, or

{2, 8, 14, 20}+24*n, where n=0, 1, 2, 3, 5, 6, 7, 8, 10, 11, 12, 13, 15, 16, 17, and 18.

12. The method of claim 11, wherein the SCS of 120 kHz is supported for common data, and a reused current 1 bit in a master information block (MIB) indicates one of two candidate values for the SCS for the common data when the SCS of the set of SSBs is detected to be 120 kHz or 60 kHz, wherein the two candidate values comprise at least 120 kHz.

13. The method of claim 11, wherein the SCS of 120 kHz is supported for common data, and a reused current 1 bit and a reserved 1 bit in a master information block (MIB) indicate one of three or four candidate values, wherein the three or four candidate values comprise at least 120 kHz.

14. The method of claim 11, wherein the SCS of 120 kHz is supported for common data, and when a SSB with a 15 kHz SCS is detected:

a subcarrier offset from subcarrier 0 in a common resource block to a subcarrier 0 of a SSB comprises seven bits, wherein four of the seven bits are from a frequency offset value in a master information block (MIB) and three of the seven bits are from:

a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device; or two of the last three bits $\bar{a}_{\bar{A}+5}$, $\bar{a}_{\bar{A}+6}$, $\bar{a}_{\bar{A}+7}$ and a spare bit located in the payload that is added by a higher layer of the network device.

15. The method of claim 11, wherein the SCS of 120 kHz is supported for common data and when a SSB with a 30 kHz SCS is detected, or a SCS of 60 kHz is supported for the common data and when a SSB with a 15 kHz SCS is detected:

a subcarrier offset from subcarrier 0 in a common resource block to a subcarrier 0 of a SSB comprises six bits, wherein four of the six bits are from a frequency offset value in a master information block (MIB) and two of the six bits are from:

two of a last three bits $\bar{a}_{\bar{A}+5}$, $\bar{a}_{\bar{A}+6}$, $\bar{a}_{\bar{A}+7}$ of a payload of a physical broadcast channel (PBCH) added by a physical layer of the network device; or one of the last three bits $\bar{a}_{\bar{A}+5}$, $\bar{a}_{\bar{A}+6}$, $\bar{a}_{\bar{A}+7}$ and a spare bit located in the payload that is added by a higher layer of the network device.

* * * * *